(12) United States Patent
Nagao et al.

(10) Patent No.: US 9,127,570 B2
(45) Date of Patent: Sep. 8, 2015

(54) MACHINE UNIT LAYOUT SYSTEM

(75) Inventors: Hideki Nagao, Minato-ku (JP); Yasushi Mori, Minato-ku (JP); Masahiro Kobayashi, Minato-ku (JP); Hiroyuki Miyata, Minato-ku (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 836 days.

(21) Appl. No.: 13/266,536

(22) PCT Filed: Jul. 28, 2010

(86) PCT No.: PCT/JP2010/062670
§ 371 (c)(1),
(2), (4) Date: Dec. 28, 2011

(87) PCT Pub. No.: WO2011/021482
PCT Pub. Date: Feb. 24, 2011

(65) Prior Publication Data
US 2012/0087778 A1    Apr. 12, 2012

(30) Foreign Application Priority Data

Aug. 19, 2009  (JP) .................................. 2009-189671

(51) Int. Cl.
*F01D 25/28* (2006.01)
*F02C 7/20* (2006.01)
(Continued)

(52) U.S. Cl.
CPC ................ *F01D 25/28* (2013.01); *F01K 13/00* (2013.01); *F02C 7/20* (2013.01); *F02C 6/003* (2013.01); *F05D 2220/72* (2013.01); *F05D 2220/74* (2013.01)

(58) Field of Classification Search
CPC ........... F01D 3/02; F01D 3/025; F01D 25/28; F01K 13/00; F01K 25/28; F02C 6/00; F02C 6/003; F02C 6/02; F05D 2220/72; F05D 2220/74

USPC ........ 415/93, 101, 103, 121.3, 143; 60/39.15, 60/39.182, 805
See application file for complete search history.

(56) References Cited

U.S. PATENT DOCUMENTS 3,696,637 A * 10/1972 Ness et al. ...................... 62/402
3,966,362 A *  6/1976 Linhardt ....................... 417/374
(Continued)

FOREIGN PATENT DOCUMENTS

| CN | 86104890 A | 2/1988 |
|----|------------|--------|
| CN | 1639466 | 7/2005 |

(Continued)

OTHER PUBLICATIONS

International Search Report issued Oct. 26, 2010 in International (PCT) Application No. PCT/JP2010/062670 w/partial English translation.

(Continued)

*Primary Examiner* — Edward Look
*Assistant Examiner* — Jason Davis
(74) *Attorney, Agent, or Firm* — Wenderoth, Lind & Ponack, L.L.P.

(57) ABSTRACT

Provided is a machine unit layout system that simplifies the layout of a compressor unit and an expander unit and is extremely effective in terms of not only the reliability of the entire machine but also maintainability. Two separate compressors, a low-pressure-side compressor and a high-pressure-side compressor (11A, 11b), are disposed on either side of a steam turbine (10). Two separate expanders, a low-pressure-side expander and a high-pressure-side expander (12A, 12B), are disposed outside the low-pressure-side and high-pressure-side compressors (11A, 11b). The steam turbine (10), the low-pressure-side and high-pressure-side compressors (11A, 11b), and the low-pressure-side and high-pressure-side expanders (12A, 12B) are coupled by rotor shafts comprising a single shaft. The torque distribution between rotator shafts is optimized.

3 Claims, 2 Drawing Sheets

(51) Int. Cl.
*F01K 13/00* (2006.01)
*F02C 6/00* (2006.01)

(56) References Cited

U.S. PATENT DOCUMENTS

| | | | |
|---|---|---|---|
| 4,969,803 | A | 11/1990 | Turanskyj |
| 5,386,687 | A | 2/1995 | Frutschi |
| 5,555,745 | A | 9/1996 | Agahi et al. |
| 2005/0074049 | A1 | 4/2005 | Tanaka et al. |
| 2006/0156728 | A1 | 7/2006 | Rodehau et al. |
| 2008/0016879 | A1* | 1/2008 | Watson et al. ............... 60/783 |

FOREIGN PATENT DOCUMENTS

| | | |
|---|---|---|
| CN | 101078578 | 11/2007 |
| CN | 200993111 | 12/2007 |
| JP | 4-255528 | 9/1992 |
| JP | 7-190524 A | 7/1995 |
| JP | 9-112207 | 4/1997 |
| JP | 2005-106738 | 4/2005 |
| JP | 2006-200531 | 8/2006 |
| JP | 2009-62848 | 3/2009 |
| RU | 38802 | 7/2004 |
| RU | 2365768 | 2/2009 |
| SU | 383859 | 5/1973 |
| SU | 503029 | 2/1976 |

OTHER PUBLICATIONS

Written Opinion of the International Searching Authority issued Oct. 26, 2010 in International (PCT) Application No. PCT/JP2010/062670 w/partial English translation.

Chinese Office Action issued Oct. 25, 2013 in corresponding Chinese Patent Application No. 201080019104.7 with English translation.

Office Action issued Aug. 5, 2014 in corresponding Chinese Patent Application No. 201080019104.7 (with English translation).

Russian Decision on Grant issued Apr. 23, 2013 in corresponding Russian Patent Application No. 2011143799/06(065713) with English translation.

* cited by examiner

MACHINE UNIT LAYOUT SYSTEM

TECHNICAL FIELD

This invention relates to a machine unit layout system for a machine unit such as a compressor unit or an expander unit.

BACKGROUND ART

A compressor (unit) for compressing a certain process gas, and an expander (unit) for recovering power by utilizing an exhaust gas or the like after treatment may be arranged as a common train on the same shaft. In this case, a geared type (speed increasing gear type) compressor and expander have hitherto been conceivable. As shown in FIG. 2, for example, one train is composed of a compressor, an expander, and a drive unit (see Patent Document 1).

A line of machines (train) as shown in FIG. 2 is one in a chemical plant, and includes a drive unit (a steam turbine and a condenser) 100, a geared type (multistage) compressor 101, a motor/electric generator 102, and a geared type (multistage) expander 103. The individual units are coupled to one another, and mounted on a base frame, namely, a machine bed or table 104. A plurality of coolers, a condenser and other instruments indispensable to the operation of the plant are located below the machine table 104.

This line of machines can be started with the steam turbine as the drive unit 100, if steam is available. In this case, the motor/electric generator 102 takes over the drive of the line of machines after the synchronous rotational speed of the motor is reached. Only when a chemical process has been started, and an exhaust gas or exhaust steam from the process drives the expander 103, the expander 103 releases power. In this manner, some of the energy can be recovered.

The line of machines can also be started with the motor/electric generator 102. If steam is generated only after the start as a result of the ongoing chemical process, then the steam turbine, as the drive unit 100, further drives the line of machines.

PRIOR ART DOCUMENTS

Patent Documents

Patent Document 1: JP-A-2006-200531 (page 4, FIG. 1)

SUMMARY OF THE INVENTION

Problems to be Solved by the Invention

The line of machines as shown in FIG. 2, however, is configured as a train having each of the units as a respective one unit. Hence, a great transmission power is involved, and shaft rigidity withstanding it is required, thus rendering the shafts and the rotating machines themselves large in size. Incidentally, the geared type unit has a plurality of shafts because of its structure. Owing to this complexity, it is usually not divided into two units.

As mentioned above, the geared type unit has a plurality of shafts. Furthermore, because of differences in operating temperature conditions between the compressor and the expander, consideration for shaft alignment is very difficult.

This has posed the problem that there are concerns not only about the reliability of the entire machine, but also about maintenance of the machine.

It is an object of the present invention, therefore, to provide a machine unit layout system which further simplifies the layout of a compressor unit and an expander unit, and is very effective for ensuring not only the reliability of the entire machine, but also the maintainability of the machine.

Means for Solving the Problems

A machine unit layout system according to the present invention, for attaining the above-mentioned object, comprises:
a drive unit;
compressor units arranged on both sides of the drive unit; and
expander units arranged outside the compressor units,
each of the units being coupled to one another by rotor shafts composed of a single shaft to optimize distribution of torque in each rotor shaft.

Beneath a machine table on which the drive unit, the compressor units, and the expander units are placed, heat exchangers corresponding to the respective units may be arranged to be located directly below the corresponding units.

At least the heat exchangers for the drive unit and the compressor units may be arranged in a direction perpendicular to the rotor shafts.

EFFECTS OF THE INVENTION

With the machine unit layout system according to the present invention, the compressor unit of the single-shaft multistage structure and the expander unit of the single-shaft multistage structure are applied, whereby it becomes easy to provide two or more of the compressor units and the expander units in an interrupted configuration. As a result, torque (transmitted power) distribution on the respective rotor shafts can be optimized, and the rotor shafts and the rotating machines can be rendered compact. Moreover, each unit of the single-shaft multistage single-casing structure can be easily supported at the shaft center position. In addition, since the rotor shafts comprise the single shaft, consideration of the shaft alignment is easy.

Consequently, there can be realized a machine unit layout system which further simplifies the layout of the compressor units and the expander units, and thus proves very effective for ensuring the reliability and maintainability of the entire machine.

DETAILED DESCRIPTION OF THE INVENTION

Figure 1:
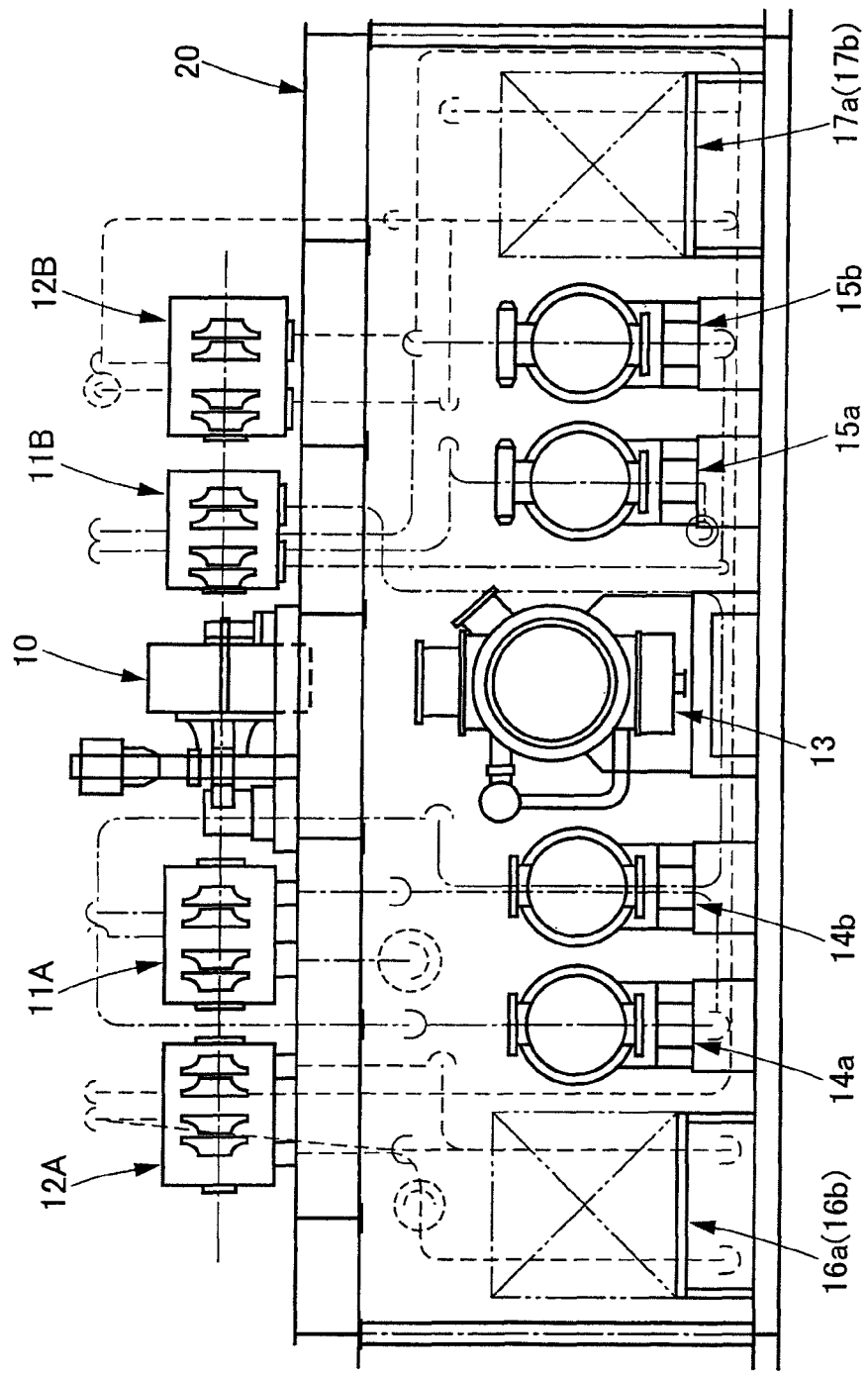
[FIG. 1] is an explanation drawing of a machine unit layout system showing an embodiment of the present invention.
Figure 2:
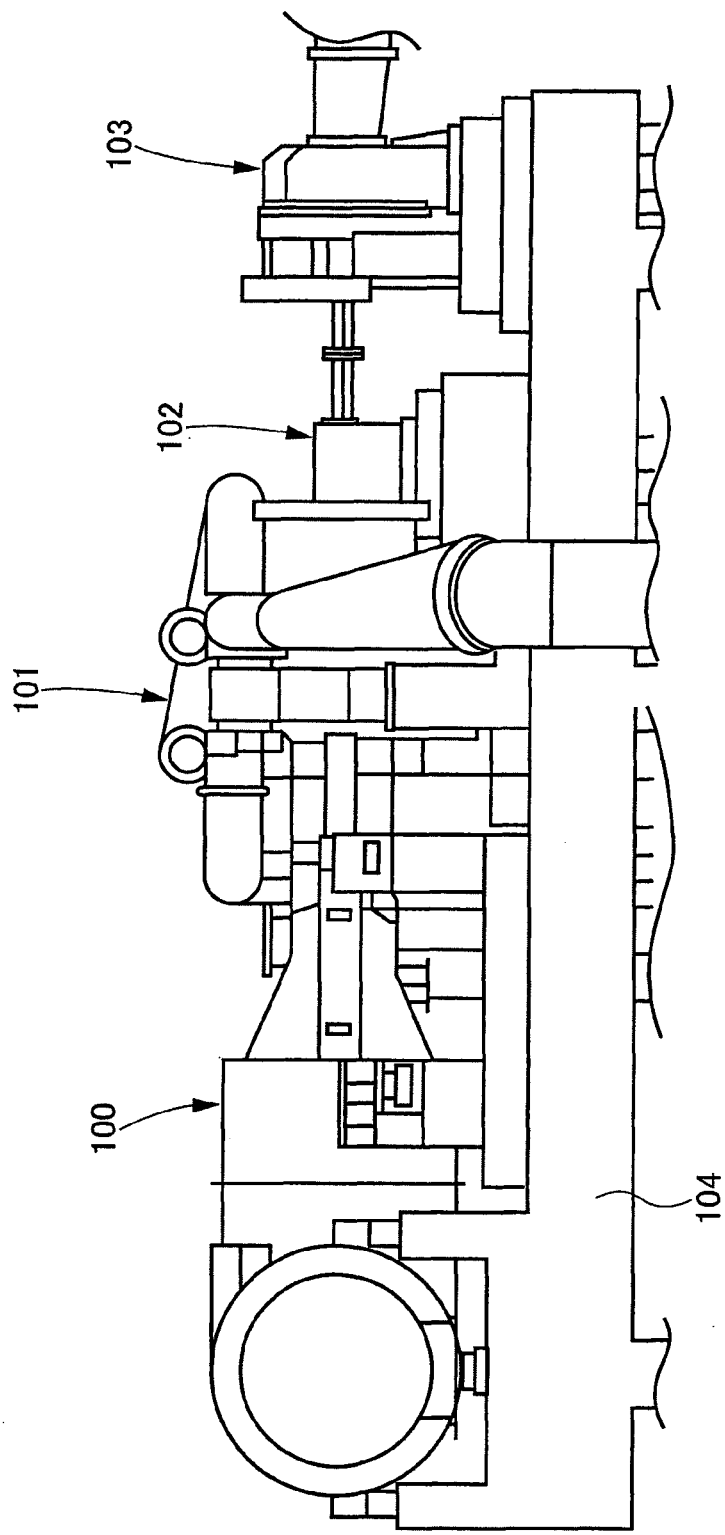
[FIG. 2] is an explanation drawing of a conventional machine unit layout system.

Hereinafter, a machine unit layout system according to the present invention will be described in detail by an embodiment with reference to the accompanying drawings.
Embodiment
FIG. 1 is an explanation drawing of a machine unit layout system showing an embodiment of the present invention.
As shown in FIG. 1, two bisectional centrifugal compressors of a single-shaft multistage structure, i.e., a low-pressure-side compressor (unit) 11A and a high-pressure-side compressor (unit) 11B, are arranged on both sides of a steam turbine 10 as a drive unit on a machine table 20. Similarly, two bisectional radial flow type expanders of a single-shaft multistage structure, i.e., a low-pressure-side expander (unit) 12A and a high-pressure-side expander (unit) 12B, are arranged outside these compressors 11A and 11B.

The steam turbine 10, the low-pressure-side and high-pressure-side compressors 11A and 11B, and the low-pressure-side and high-pressure-side expanders 12A and 12B are coupled together by rotor shafts composed of a single shaft (see a dashed dotted line in the drawing) via required couplings (not shown). The respective rotor shafts are designed to distribute torque (transmitted power) optimally.

Underneath the machine table 20 (strictly, within the machine table), a shell and tube condenser (heat exchanger) 13 for cooling steam, which has been discharged from the steam turbine 10, with water to condense it to water is located directly below the steam turbine 10 and in a direction perpendicular to the rotor shafts. Shell and tube gas coolers (heat exchangers) 14a, 14b and 15a, 15b corresponding to the two sections, which serve the low-pressure-side and high-pressure-side compressors 11A and 11B, respectively, are located directly below the corresponding low-pressure-side and high-pressure-side compressors 11A and 11B, and arranged in a direction perpendicular to the rotor shafts.

Box-shaped heat exchangers (optionally, shell and tube gas coolers (heat exchangers)) 16a, 16b and 17a, 17b corresponding to the two sections, which serve the low-pressure-side and high-pressure-side expanders 12A and 12B, respectively, are arranged to be located directly below the corresponding low-pressure-side and high-pressure-side expanders 12A and 12B. The heat exchangers 16a, 16b and 17a, 17b, the former and the latter each being in a tandem arrangement, are arranged in a direction perpendicular to the rotor shafts.

Because of the above configuration, when steam is supplied from a steam source (not shown) to the steam turbine 10, the low-pressure-side and high-pressure-side compressors 11A and 11B and the low-pressure-side and high-pressure-side expanders 12A and 12B, which are coupled to the steam turbine 10 by the rotor shafts comprising the single shaft, are rotationally driven.

The process gas supplied to the low-pressure-side compressor 11A is compressed by the two compressor sections, and the resulting compressed gas from the respective sections is cooled by the gas coolers 14a, 14b. The process gas exiting from the low-pressure-side compressor 11A is supplied to the high-pressure-side compressor 11B. In this high-pressure-side compressor 11B as well, the process gas is compressed by the two compressor sections, and the resulting compressed gas from the respective sections is cooled by the gas coolers 15a, 15b (see pipelines indicated by dashed dotted lines in the drawing). The process gas exiting from the high-pressure-side compressor 11B is supplied to required treatment facilities.

The treated high-pressure gas supplied to the high-pressure-side expander 12B is sucked and expanded by the two expander sections to recover power. On this occasion, the expanded gas from the respective sections is utilized as a heat source in the heat exchangers 17a, 17b. The expanded gas exiting from the high-pressure-side expander 12B is supplied to the low-pressure-side expander 12A. In this low-pressure-side expander 12A as well, the expanded gas is sucked and expanded by the two expander sections to recover power. The so treated expanded gas from the respective sections is cooled by the heat exchangers 17a, 17b (see pipelines indicated by dashed lines in the drawing).

In the present embodiment, as described above, the compressor units of the single-shaft multistage structure and the expander units of the single-shaft multistage structure are applied, whereby it becomes easy to provide the low-pressure-side and high-pressure-side compressors 11A, 11B and the low-pressure-side and high-pressure-side expanders 12A, 12B in interrupted arrangements as two or more units (two units in the illustrated embodiment). As a result, torque (transmitted power) distribution on the respective rotor shafts can be optimized, and the rotor shafts and the rotating machines can be rendered compact. Moreover, each unit can achieve a single-shaft multistage single-casing structure, so that each unit can be easily supported at the shaft center position. In addition, since the rotor shafts comprise the single shaft, consideration of the shaft alignment is easy.

Furthermore, the gas coolers 14a, 14b and 15a, 15b for the low-pressure-side and high-pressure-side compressors 11A and 11B, and the heat exchangers 16a, 16b and 17a, 17b for the low-pressure-side and high-pressure-side expanders 12A, 12B are also compact. Thus, they can all be effectively arranged directly below the rotating machines.

Consequently, there can be realized a machine unit layout system which further simplifies the layout of the compressor units and the expander units, and is thus very effective for ensuring the reliability and maintainability of the entire machine.

It goes without saying that the present invention is not limited to the above embodiment, and various changes and modifications, such as a change in the number of the compressors and the expanders (change to three or more units), and a change in the number of the sections in each compressor and each expander, may be made without departing from the gist of the present invention.

INDUSTRIAL APPLICABILITY

The machine unit layout system according to the present invention can be applied to a chemical plant or the like which is equipped with a compressor for compressing a certain process gas, and an expander for recovering power by utilizing an exhaust gas or the like after treatment.

EXPLANATIONS OF LETTERS OR NUMERALS

10 Steam turbine
11A, 11B Low-pressure-side and high-pressure-side compressors
12A, 12B Low-pressure-side and high-pressure-side expanders
13 Condenser
14a, 14b Gas coolers for low-pressure-side compressor
15a, 15b Gas coolers for high-pressure-side compressor
16a, 16b Heat exchangers for low-pressure-side expander
17a, 17b Heat exchangers for high-pressure-side expander
20 Machine table

The invention claimed is:
1. A machine unit layout system, comprising:
a drive unit;
a low-pressure-side compressor unit and a high-pressure-side compressor unit in a single-shaft multistage structure, the compressor units each including a plurality of sections, the compressor units being disposed in an interrupted arrangement on both sides of the drive unit, the pluralities of sections in the low-pressure-side compressor unit and the high-pressure-side compressor unit being arranged so as to have two gas flow directions which are opposed directions along rotor shafts; and
a low-pressure-side expander unit and a high-pressure-side expander unit in a single-shaft multistage structure, the expander units each including a plurality of sections, the expander units being disposed in an interrupted arrangement outside the compressor units, the pluralities of sections in the low-pressure-side expander unit and the high-pressure-side expander unit being arranged so as to have two gas flow directions which are opposed directions along the rotor shafts, each of the units being coupled to one another by rotor shafts composed of a single shaft to optimize distribution of torque in each rotor shaft.

2. The machine unit layout system according to claim 1, wherein beneath a machine table on which the drive unit, the compressor units, and the expander units are placed, heat exchangers corresponding to the respective units are arranged to be located directly below the corresponding units.

3. The machine unit layout system according to claim 2, wherein at least the heat exchangers corresponding to the drive unit and the compressor units are arranged in a direction perpendicular to the rotor shafts.

* * * * *